United States Patent [19]

Lowe et al.

[11] Patent Number: 5,707,912
[45] Date of Patent: Jan. 13, 1998

[54] PROCESS FOR THE TREATMENT OF CLAY MATERIALS TO PROVIDE SLURRIES HAVING IMPROVED RHEOLOGICAL PROPERTIES

[75] Inventors: Robert A. Lowe, Milledgeville; Prakash B. Malla, Dublin, both of Ga.

[73] Assignee: Thiele Kaolin Company, Sandersville, Ga.

[21] Appl. No.: 617,964

[22] Filed: Mar. 18, 1996

[51] Int. Cl.[6] .................................................. C04B 33/04
[52] U.S. Cl. ........................ 501/147; 501/146; 106/486; 106/DIG. 4
[58] Field of Search ........................... 501/147, 146; 106/DIG. 4, 486

[56] References Cited

U.S. PATENT DOCUMENTS

| | | | |
|---|---|---|---|
| 3,115,416 | 12/1963 | Chavrier | 501/147 |
| 3,674,521 | 7/1972 | Noble | 501/147 |
| 4,105,466 | 8/1978 | Kunkle et al. | 106/486 |
| 4,144,083 | 3/1979 | Abercrombie, Jr. | 501/146 |
| 4,477,422 | 10/1984 | Ginn | 423/328.2 |
| 5,089,056 | 2/1992 | Shi et al. | 106/486 |
| 5,266,538 | 11/1993 | Knudson et al. | 501/147 |
| 5,328,880 | 7/1994 | Lampert et al. | 501/148 |
| 5,332,493 | 7/1994 | Ginn et al. | 209/164 |
| 5,407,480 | 4/1995 | Payton et al. | 106/487 |
| 5,424,259 | 6/1995 | Yordan et al. | 501/146 |
| 5,543,372 | 8/1996 | Shi et al. | 501/145 |

OTHER PUBLICATIONS

Ceramic Industry, Jan. 1988 vol. 130 No. 1 pp. 122–123 Corcoran Publication.

PCT International Publication No. WO 95/09135; entitled "Stabilized, High Solids, Low Viscosity Smectite Slurries, and Method of Preparation"; publication date—Apr. 6, 1995.

*Primary Examiner*—Mark L. Bell
*Assistant Examiner*—Louis M. Troilo
*Attorney, Agent, or Firm*—Jones & Askew, LLP

[57] ABSTRACT

Clay materials, such as kaolin, containing expandable layer-silicates are chemically treated with a source of magnesium cations, followed by a pH adjustment, to provide a slurry product having improved rheological properties.

20 Claims, No Drawings

5,707,912

PROCESS FOR THE TREATMENT OF CLAY MATERIALS TO PROVIDE SLURRIES HAVING IMPROVED RHEOLOGICAL PROPERTIES

TECHNICAL FIELD

This invention relates to a process for the treatment of clay materials to provide slurries having improved rheological properties. In a more specific aspect, this invention relates to a process for the chemical treatment of clay materials to provide slurries having improved rheological properties, wherein the starting clay materials contain expandable layer-silicates. This invention also relates to clay materials treated by the process of this invention.

This invention will be described with specific reference to the treatment of kaolin clay which contains expandable layer-silicates. However, this invention should be understood as useful to improve the rheological properties of other clay materials which contain expandable layer-silicates. Examples of such other clay materials include bentonite and fuller's earth. Therefore, although especially useful with regard to kaolin clay, this invention is useful for the treatment of other clay materials which contain expandable layer-silicates.

BACKGROUND OF THE INVENTION

Kaolin is a naturally occurring, relatively fine, white clay which may be generally described as a hydrated aluminum silicate. After purification and beneficiation, kaolin clay is widely used as a filler and pigment in various materials, such as rubber and resins, and in various coatings, such as paints and coatings for paper.

The use of kaolin clay in coatings for paper serves, for example, to improve the opacity of the coated paper. Opacity in such paper coatings is enhanced by the light scattering ability of the kaolin clay, and such ability can be estimated by the scattering coefficient as described in TAPPI, 1978, Vol., 61, No. 6, pages 78–80.

From a general standpoint, the kaolin clays of Georgia can be classified into two types—(1) hard, fine-grained Tertiary kaolin clays and (2) soft, coarse-grained Cretaceous kaolin clays. In some instances, kaolin clays exist which exhibit physico-chemical characteristics of both types.

Weathering of the sediments which formed the kaolin clays of Georgia has also formed very fine-grained (i.e., less than 0.2 microns in equivalent spherical diameter) expandable layer-silicate minerals, such as smectite and illite. Within the kaolin clay deposits, these minerals may occur as coatings on the stacks, books and platelets of kaolinite.

Smectites, a group of expandable layer-silicate minerals which originate from a variety of sources, including the alteration of volcanic material and the weathering of minerals in soil environments, have the ability to expand and contract when water enters and exits the interlayer region of the mineral. Furthermore, smectites have the capacity to contain a wide variety of exchangeable cations within the interlayer region. Some of the common smectite minerals include saponite, hectorite, montmorillonite, beidellite and nontronite.

The swelling nature of smectites causes clay/water mixtures containing these minerals to be thioxtropic in nature with high low-shear viscosities (i.e., high Brookfield viscosities). The swelling nature of smectites also enables these clays to be commercially important and useful in a variety of applications, including drilling mud, bleaching clay, iron-ore pelletizing and foundry sand. However, the presence of smectites can also render the clay materials to be non-useful for other commercially important applications, such as in paper coatings and fillers, because smectites impart high low-shear viscosities to these clay materials.

Kaolin pigments to be used as paper coatings and fillers are typically utilized in high solids (60%–70% solids by weight) clay slurries. When expandable layer-silicates (e.g., smectites) become concentrated within a kaolin slurry, poor rheological properties become manifest. In slurries of high clay content, the presence of a few percent expandable clay material can be very detrimental to the rheological properties of the slurry. Even when other characteristics (e.g., brightness) of the kaolin pigment are satisfactory for producing a commercial grade pigment, the presence of minute quantities of expandable layer-silicates can turn that pigment into a non-commercial grade due to poor rheological properties.

Several approaches have been reported in regard to improving the rheological properties of kaolin clay slurries which contain expandable layer-silicates. In some of these cases, the expandable layer-silicates have been modified to reduce their effect on the viscosity without physically removing them from the clay. Many of these methods consist of placing various materials in the interlayer region of the expandable layer-silicates. These methods tend to focus on the reduction of the swellability, or absorption of water, by the expandable layer-silicates to improve the rheological properties of kaolin slurries containing these minerals.

Several patents discuss the saturation of the interlayer region of expandable layer-silicates with various inorganic cationic species. In U.S. Pat. No. 3,674,521, the kaolin clays are saturated with a source of lithium or magnesium cations followed by heat treatment of the clay at 200° C.–450° C. In this patent, the presence of the lithium or magnesium cations and the heat treatment tend to reduce the swellability of the smectite, thereby improving the rheology of kaolin slurries treated in this manner.

U.S. Pat. No. 4,477,422 saturates the interlayer region of the expandable layer-silicates with potassium cations followed by heat treatment of the saturated kaolin. In this method, the improvement in the rheological properties of kaolin slurries occurs due to the reduction in the swellability of the expandable layer-silicates, especially illite.

U.S. Pat. No. 5,328,880 describes the saturation of the expandable layer-silicates with an organic cationic species. In this method of viscosity reduction, a tetraalkyl ammonium compound is used to saturate the expandable phase. The saturation reduces the swellability of the smectite and improves the rheological properties of kaolin clay slurries.

Several processes which deal with improving the viscosity of kaolin slurries utilize inorganic complexes. In U.S. Pat. No. 4,105,466, an aluminum-based inorganic polymeric complex is added to the kaolin and kneaded. The synergistic effect of the complex and the kneading action has the tendency to reduce the detrimental effect which expandable layer-silicates have on the rheological properties of a slurry of a clay treated in this manner.

U.S. Pat. No. 5,332,493 describes converting the smectites to a pillared clay by placing or intercalating a polymeric cationic hydroxy metal complex into the interlayer region of the expandable layer-silicates. The goal of this method, however, is to insert a complex which is ferromagnetic or diamagnetic so that the smectite is made magnetically susceptible and then can be removed by magnetic separation. The removal of the impurity reduces the concentration and improves the rheological properties of the slurry.

Other methods concerning the reduction of smectite swelling for clay slurries address the reduction of the swelling nature by placing organic materials within the interlayer region of the mineral. International Patent Publication No. WO 95/09135 discusses this reduction in smectite swelling by mixing an amine salt into the slurry. The amine effectively inhibits the swelling capacity of the smectite thereby reducing the gelling problem associated with most smectite slurries and allowing a higher clay solids content to be obtained.

However, for various reasons, the above-described prior art processes do not consistently and efficiently provide the desired results when treating clays which contain expandable layer-silicates. Therefore, a need exists in the industry for a process by which these clays can be treated to provide clay slurries with improved rheological properties.

SUMMARY OF THE INVENTION

Briefly described, the present invention provides a process for treating clay materials which contain expandable layer-silicates. More specifically, this invention provides a process by which such clay materials are chemically treated to precipitate a magnesium hydroxide complex within the expandable phase interlayer region. The precipitated complex is believed to form a stable compact layer within the interlayer region which reduces the swelling capacity of the expandable layer-silicates and improves the rheological properties of the treated clay material.

The process of this invention also provides for the reduction or tailoring of the cation exchange capacity (CEC) of clays which contain smectites. Reduction in the CEC of the treated clays (i.e., clays which have been treated according to this invention) confirms the precipitation of a non-exchangeable magnesium hydroxide layer in the interlayer region of the smectite and a corresponding reduction in the swelling capacity of the clay. We believe that such corresponding reduction in the swelling capacity of the clay is a primary reason for the improved rheological properties of the clay slurries which have been treated by the process of this invention. By varying the amount of magnesium and hydroxide ions used in the treatment, the CEC of the smectite can be tailored, thereby modifying the exchange and swelling properties of the smectite to meet product requirements.

This invention also provides a clay slurry which, after being treated by the process of this invention, has improved rheological properties. In this application, the term "rheological properties" refers to the viscosity or flow characteristics of the clay slurry.

By the term "improved rheological properties", we mean that the flow characteristics (i.e., viscosity) of the slurry treated by this invention are improved over the flow characteristics of a slurry which has not been treated by this invention, when the two slurries are compared at equivalent solids content.

Additionally, this invention provides clay materials which can be used to form slurries having improved rheological properties.

Accordingly, an object of this invention is to provide a process for treating clay materials.

Another object of this invention is to provide a process for the chemical treatment of clay materials.

Another object of this invention is to provide a process for the chemical treatment of kaolin clay to produce kaolin clay having rheological properties which are improved over the rheological properties of kaolin clay which has not been treated by this invention.

Still another object of this invention is to provide kaolin clay having improved rheological properties.

Still another object of this invention is to provide a process for reducing or tailoring the cation exchange capacity of clay materials which contain expandable layer-silicates.

These and other objects, features and advantages of this invention will become apparent from the following detailed description.

BRIEF DESCRIPTION OF THE INVENTION

In accordance with the present invention, a clay material having expandable layer-silicates is chemically treated by a process which comprises the following steps:

A. obtaining an initial slurry of a clay material which contains expandable layer-silicates;

B. treating the clay slurry with a source of magnesium cations; and

C. adding a base solution to the treated clay slurry to achieve a molar ratio of hydroxide:magnesium ions of about 1.0:1.0 to about 2.5:1.0, whereby a treated clay slurry is produced having improved rheological properties.

In the process of this invention, the initial clay slurry may be obtained by methods which are conventional in this industry. The process of this invention may also be accomplished by using equipment which is conventional in this industry.

The magnesium cations may be derived from various magnesium-containing compounds, such as magnesium chloride, magnesium nitrate, magnesium sulfate, magnesium hydroxide, magnesium acetate and mixtures thereof.

This invention can be used to effectively treat clay materials when the molar ratio of hydroxide:magnesium ions is from about 1.0:1.0 to about 2.5:1.0, preferably from about 1.0:1.0 to about 2.0:1.0.

Various base solutions can be added to the treated clay slurry to achieve the desired molar ratio of hydroxide:magnesium ions. Examples of such base solutions are sodium hydroxide, potassium hydroxide, ammonium hydroxide, lithium hydroxide, soda ash and mixtures thereof.

The amount of magnesium used in this process is dependent upon two factors—(1) the cation exchange capacity of the starting clay material and (2) the desired cation exchange capacity of the treated product.

The present invention is further illustrated by the following examples which are illustrative of certain embodiments designed to teach those of ordinary skill in this art how to practice this invention and to represent the best mode contemplated for carrying out this invention.

All Brookfield viscosities (i.e., low-shear viscosities) in the following examples are determined for whole-fraction (i.e., unfractionated) slurries at 20 and 100 rpm using TAPPI method T-648 om-88 as revised in 1988. The cation exchange capacity is determined by the Phelps et al. method, which is described in Funk, J. E. and Dinger, D. R., "Methylene Blue Index" Chapter 42 in *Predictive Process Control of Crowded Particulate Suspensions*, Kluwer Academic Publishers, Boston/Dordrecht/London, (1994).

EXAMPLES I–III

These 3 examples are carried out using a fine-grained Tertiary kaolin which is not considered to be of commercial grade due to its extremely poor rheology. All Brookfield viscosities of the processed spray-dried samples below are run to a minimum low-shear viscosity using sodium polyacrylate as the dispersant and soda ash as the pH regulator adjusting to a pH of approximately 7.0 (when necessary). All rheological results for the control and Examples I–III are listed in Tables 1 and 2.

Control

Conventional Process 1000 grams of a fine-grained Tertiary kaolin is blunged at 25% solids with sodium hexametaphosphate using a Cowles type blunger. The resulting slurry is filtered and dried in an 80° C. oven. The oven-dried filter cake is redispersed to 30% solids with sodium polyacrylate while adjusting to a pH of 7.0–7.4 with soda ash. The redispersed slurry is then screened through a 270 mesh sieve and spray-dried.

Example I 1000 grams of a fine-grained Tertiary kaolin is blunged at 25% solids with sodium hexametaphosphate using a Cowles type blunger. The 25% solids slurry is then saturated with 0.23% $MgCl_2$ for 24 hrs. After saturation, 0.175% NaOH (0.8% solution) is slowly added to the saturated clay while intensely mixing at 5000 rpm with a Premier brand mixer. After addition of the NaOH solution, mixing is continued for 3 hours at 3000 rpm using a Premier brand mixer. The resulting slurry is then filtered, resuspended to 20% solids, refiltered, and the filter cake dried in an 80° C. oven. The oven-dried filter cake is then redispersed to 30% solids with sodium polyacrylate, screened using a 270 mesh sieve and spray-dried.

Example II

The procedure of Example I is followed, except that 0.35% $MgCl_2$ and 0.26% NaOH are used.

Example III

The procedure of Example I is followed, except that 0.45% $MgCl_2$ and 0.35% NaOH are used.

TABLE 1

| | BROOKFIELD VISCOSITY | | |
|---|---|---|---|
| EXAMPLE | 20 RPM (cP) | 100 RPM (cP) | % SOLIDS |
| Control | 430 | 190 | 53.0 |
| Example I | 276 | 152 | 53.0 |
| Example II | 79 | 73 | 53.0 |
| Example III | 67 | 70 | 52.9 |

TABLE 2

| | BROOKFIELD VISCOSITY | | |
|---|---|---|---|
| EXAMPLE | 20 RPM (cP) | 100 RPM (cP) | % SOLIDS |
| Control | 282 | 135 | 51.3 |
| Example I | 276 | 152 | 53.0 |

TABLE 2-continued

| | BROOKFIELD VISCOSITY | | |
|---|---|---|---|
| EXAMPLE | 20 RPM (cP) | 100 RPM (cP) | % SOLIDS |
| Example II | 286 | 143 | 57.6 |
| Example III | 282 | 157 | 57.9 |

Tables 1 and 2 contain the viscosity results for the conventionally treated clay (i.e., the two controls) along with the clays treated by the process of this invention. Table 1 shows the variation in minimum Brookfield viscosity for the treated and untreated clay slurries at a constant percent clay solids. The results reveal a viscosity decrease, at 53.0 percent solids, from 430 centipoises at 20 rpm for the conventionally treated control slurry to 67 centipoises at 20 rpm for the clay slurry (Example III) treated by the process of this invention.

Table 2 shows the difference in percent clay solids for slurries at a constant viscosity (centipoises at 20 rpm) for the conventionally treated control slurry and the clay slurries treated by the process of this invention. The results reveal a treated clay slurry (Example III) can obtain a viscosity of 282 centipoises at 57.9 percent solids, whereas an untreated control slurry obtains the same viscosity at only 51.3 percent solids.

Table 1 reveals the improvement in viscosity brought about by the process of this invention. Table 2 shows that one can obtain an equivalent viscosity at a much higher percent solids when the clay material is treated by the process of this invention.

Examples IV–V

In these 2 examples, a blend of coarse-grained Cretaceous kaolin and a source of expandable layer-silicate minerals from the Middle Georgia region, otherwise known as Twiggs clay, is made. All Brookfield viscosities of the processed spray-dried blended clay samples below are run to a minimum low-shear viscosity using sodium polyacrylate as the dispersant and sodium hydroxide as the pH regulator (when necessary). Rheological properties for the control and Examples IV–V are listed in Tables 3 and 4.

Control

Conventional Process 2000 grams of clay, containing 2% by weight of Twiggs clay blended with the coarse-grained Cretaceous kaolin, is blunged at 35% solids with sodium hexametaphosphate as the dispersant and soda ash as the pH modifier using a Cowles type blunger. The resulting slurry is screened using a 270 mesh screen. After screening, the slurry is leached with sodium dithionite and alum, filtered, resuspended to 20% solids and refiltered. A portion of the leached clay is then resuspended to 20% solids, dispersed with sodium polyacrylate and soda ash to a pH of 7.0, screened through a 325 mesh and spray-dried.

Example IV 2000 grams of clay, containing 2% by weight of Twiggs clay blended with the coarse-grained Cretaceous kaolin, is blunged at 35% solids with sodium hexametaphosphate as the dispersant and soda ash as the pH modifier using a Cowles type blunger. The resulting slurry is screened using a 270 mesh screen. After screening, the slurry is leached with sodium dithionite and alum, filtered, resuspended to 20% solids and refiltered. A portion of the leached clay is then resuspended to 20% solids and saturated with 0.34% $MgCl_2$ for 24 hrs. After saturation, 0.25% NaOH (0.8% solution) is slowly added to the saturated clay while intensely mixing at 3000 rpm with a Premier brand mixer. After addition of the NaOH solution, the mixture is mixed for 15 minutes at 3000 rpm using a Premier brand mixer. The resulting slurry is then filtered, resuspended to 20% solids and refiltered. The filtered clay is then resuspended to 20% solids and dispersed with sodium polyacrylate, screened through a 325 mesh sieve and spray-dried.

Example V

The procedure of Example IV is followed, except that 0.73% $MgCl_2$ and 0.53% NaOH are used.

TABLE 3

| EXAMPLE | BROOKFIELD VISCOSITY | | % SOLIDS |
|---|---|---|---|
| | 20 RPM (cP) | 100 RPM (cP) | |
| Control | 418 | 260 | 70.1 |
| Example IV | 330 | 230 | 70.0 |
| Example V | 192 | 170 | 70.0 |

TABLE 4

| EXAMPLE | BROOKFIELD VISCOSITY | | % SOLIDS |
|---|---|---|---|
| | 20 RPM (cP) | 100 RPM (cP) | |
| Control | 102 | 94 | 63.9 |
| Example IV | 102 | 98 | 64.8 |
| Example V | 104 | 110 | 67.1 |

Tables 3 and 4 contain the viscosity results for the conventionally treated clay (i.e., the two controls) along with the clays treated by the process of this invention. Table 3 shows the variation in minimum Brookfield viscosity for the treated and untreated clay slurries at a constant percent clay solids. The results reveal a viscosity decrease, at 70.1 percent solids, from 418 centipoises at 20 rpm for the conventionally treated control slurry to 192 centipoises at 20 rpm for the clay slurry (Example V) treated by the process of this invention.

Table 4 shows the differences in percent clay solids for slurries at a constant viscosity (centipoises at 20 rpm) for the conventionally treated control slurry and the clay slurries treated by the process of this invention. The results reveal a treated clay slurry (Example V) can obtain a viscosity of 104 centipoises at 67.1 percent solids, whereas an untreated control slurry obtains the same viscosity at only 63.9 percent solids.

Table 3 reveals the improvement in viscosity brought about by the process of this invention. Table 4 shows that one can obtain an equivalent viscosity at a much higher percent solids when the clay material is treated by the process of this invention.

Examples VI–VII

In these 2 examples, a blend of coarse-grained Cretaceous kaolin and a source of expandable layer-silicate minerals from the Middle Georgia region, otherwise known as Twiggs clay, is made. All Brookfield viscosities (20 rpm) of the processed spray-dried blended clay samples below are run to a minimum low-shear viscosity using sodium polyacrylate as the dispersant and sodium hydroxide as the pH regulator (when necessary). Rheological properties for the control and Examples VI–VII are listed in Tables 5 and 6.

Control

Conventional Process 2000 grams of clay, containing 4% by weight of Twiggs clay blended with the coarse-grained Cretaceous kaolin, is blunged at 35% solids with sodium hexametaphosphate as the dispersant and soda ash as the pH modifier using a Cowles type blunger. The resulting slurry is screened using a 270 mesh screen. After screening, the slurry is then leached with sodium dithionite and alum, filtered, resuspended to 20% solids and refiltered. A portion of the leached clay is then resuspended to 20% solids, dispersed with sodium polyacrylate and soda ash to a pH of 7.0, screened through a 325 mesh and spray-dried.

Example VI 2000 grams of clay, containing 4% by weight of Twiggs clay blended with the coarse-grained Cretaceous kaolin, is blunged at 35% solids with sodium hexametaphosphate as the dispersant and soda ash as the pH modifier using a Cowles type blunger. The resulting slurry is screened using a 270 mesh screen. After screening, the slurry is leached with sodium dithionite and alum, filtered, resuspended to 20% solids and refiltered. A portion of the leached clay is then resuspended to 20% solids and saturated with 0.82% $MgCl_2$ for 24 hrs. After saturation, 0.60% NaOH (0.8% solution) is slowly added to the saturated clay while intensely mixing at 3000 rpm with a Premier brand mixer. After addition of the NaOH solution, the mixture is mixed for 15 minutes at 3000 rpm using a Premier brand mixer. The resulting slurry is then filtered, resuspended to 20% solids and re filtered. The filtered clay is then resuspended to 20% solids and dispersed with sodium polyacrylate, screened through a 325 mesh sieve and spray-dried.

Example VII

The procedure of Example VI is followed, except that 1.72% $MgCl_2$ and 1.26% NaOH are used.

TABLE 5

| EXAMPLE | BROOKFIELD VISCOSITY | | % SOLIDS |
|---|---|---|---|
| | 20 RPM (cP) | 100 RPM (cP) | |
| Control | 1250 | 570 | 69.7 |
| Example VI | 634 | 382 | 69.8 |
| Example VII | 560 | 338 | 70.0 |

TABLE 6

| | BROOKFIELD VISCOSITY | | |
|---|---|---|---|
| EXAMPLE | 20 RPM (cP) | 100 RPM (cP) | % SOLIDS |
| Control | 104 | 72 | 56.5 |
| Example VI | 102 | 83 | 60.9 |
| Example VII | 96 | 85 | 62.6 |

Tables 5 and 6 contain the viscosity results for the conventionally treated clay (i.e., the two controls) along with the clays treated by the process of this invention. Table 5 shows the variation in minimum Brookfield viscosity for the treated and untreated clay slurries at a constant percent clay solids. The results reveal a viscosity decrease, at 69.7 percent solids, from 1250 centipoises at 20 rpm for the conventionally treated control slurry to 560 centipoises at 20 rpm for the clay slurry (Example VII) treated by the process of this invention.

Table 6 shows the differences in percent clay solids for slurries at a constant viscosity (centipoises at 20 rpm) for the conventionally treated control slurry and the clay slurries treated by the process of this invention. The results reveal a treated clay slurry (Example VII) can obtain a viscosity of 96 centipoises at 62.6 percent solids, whereas an untreated control slurry obtains the same viscosity at only 56.5 percent solids.

Table 5 reveals the improvement in viscosity brought about by the process of this invention. Table 6 shows that one can obtain an equivalent viscosity at a much higher percent solids when the clay material is treated by the process of this invention.

Examples VIII–IX

In these 2 examples, a blend of coarse-grained Cretaceous kaolin and a source of expandable layer-silicate minerals from the Middle Georgia region, otherwise known as Twiggs clay, is made. All Brookfield viscosities (20 rpm) of the processed spray-dried blended clay samples below are run to a minimum low-shear viscosity using sodium polyacrylate as the dispersant and sodium hydroxide as the pH regulator (when necessary). Rheological properties for the control and Examples VIII–XI are listed in Tables 7 and 8.

Control

Conventional Process 2000 grams of clay, containing 6% by weight of Twiggs clay blended with the coarse-grained Cretaceous kaolin, is blunged at 35% solids with sodium hexametaphosphate as the dispersant and soda ash as the pH modifier using a Cowles type blunger. The resulting slurry is screened using a 270 mesh screen. After screening, the slurry is leached with sodium dithionite and alum, filtered, resuspended to 20% solids and refiltered. A portion of the leached clay is then resuspended to 20% solids, dispersed with sodium polyacrylate and soda ash to a pH of 7.0, screened through a 325 mesh and spray-dried.

Example VIII 2000 grams of clay, containing 6% by weight of Twiggs clay blended with the coarse-grained Cretaceous kaolin, is blunged at 35% solids with sodium hexametaphosphate as the dispersant and soda ash as the pH modifier using a Cowles type blunger. The resulting slurry is screened using a 270 mesh screen. After screening, the slurry is leached with sodium dithionite and alum, filtered, resuspended to 20% solids and refiltered. A portion of the leached clay is then resuspended to 20% solids and saturated with 1.20% $MgCl_2$ for 24 hrs. After saturation, 0.88% NaOH (0.8% solution) is slowly added to the saturated clay while intensely mixing at 3000 rpm with a Premier brand mixer. After addition of the NaOH solution, the mixture is mixed for 15 minutes at 3000 rpm using a Premier brand mixer. The resulting slurry is then filtered, resuspended to 20% solids and refiltered. The filtered clay is then resuspended to 20% solids and dispersed with sodium polyacrylate, screened through a 325 mesh sieve and spray-dried.

Example IX

The procedure of Example VIII is followed, except that 2.54% $MgCl_2$ and 1.86% NaOH are used.

TABLE 7

| | BROOKFIELD VISCOSITY | | |
|---|---|---|---|
| EXAMPLE | 20 RPM (cP) | 100 RPM (cP) | % SOLIDS |
| Control | 642 | 310 | 63.1 |
| Example VIII | 138 | 128 | 63.2 |
| Example IX | 100 | 107 | 63.1 |

TABLE 8

| | BROOKFIELD VISCOSITY | | |
|---|---|---|---|
| EXAMPLE | 20 RPM (cP) | 100 RPM (cP) | % SOLIDS |
| Control | 100 | 81 | 53.8 |
| Example XIII | 98 | 104 | 61.6 |
| Example IX | 100 | 107 | 63.1 |

Tables 7 and 8 contain the viscosity results for the conventionally treated clay (i.e., the two controls) along with the clays treated by the process of this invention. Table 7 shows the variation in minimum Brookfield viscosity for the treated and untreated clay slurries at a constant percent clay solids. The results reveal a viscosity decrease, at 63.1 percent solids, from 642 centipoises at 20 rpm for the conventionally treated control slurry to 100 centipoises at 20 rpm for the clay slurry (Example IX) treated by the process of this invention.

Table 8 shows the differences in percent clay solids for slurries at a constant viscosity (centipoises at 20 rpm) for the conventionally treated control slurry and the clay slurries treated by the process of this invention. The results reveal a treated clay slurry (Example IX) can obtain a viscosity of 100 centipoises at 63.1 percent solids, whereas an untreated control slurry obtains the same viscosity at only 53.8 percent solids.

Table 7 reveals the improvement in viscosity brought about by the process of this invention. Table 8 shows that one can obtain an equivalent viscosity at a much higher percent solids when the clay material is treated by the process of this invention.

Examples X–XI

In these 2 examples, a blend of coarse-grained Cretaceous kaolin and a source of expandable layer-silicate minerals from the Middle Georgia region, otherwise known as Twiggs clay, is made. All Brookfield viscosities (20 rpm) of the processed spray-dried blended clay samples below are run to a minimum low-shear viscosity using sodium polyacrylate as the dispersant and sodium hydroxide as the pH regulator (when necessary). Rheological properties for the control and Examples X–XI are listed in Tables 9 and 10.

Control

Conventional Process 2000 grams of clay, containing 10% by weight of Twiggs clay blended with the coarse-grained Cretaceous kaolin, is blunged at 35% solids with sodium hexametaphosphate as the dispersant and soda ash as the pH modifier using a Cowles type blunger. The resulting slurry is screened using a 270 mesh screen. After screening, the slurry is leached with sodium dithionite and alum, filtered, resuspended to 20% solids and refiltered. A portion of the leached clay is then resuspended to 20% solids, dispersed with sodium polyacrylate and soda ash to a pH of 7.0, screened through a 325 mesh and spray-dried.

Example X 2000 grams of clay, containing 10% by weight of Twiggs clay blended with the coarse-grained Cretaceous kaolin, is blunged at 35% solids with sodium hexametaphosphate as the dispersant and soda ash as the pH modifier using a Cowles type blunger. The resulting slurry is screened using a 270 mesh screen. After screening, the slurry is then leached with sodium dithionite and alum, filtered, resuspended to 20% solids and refiltered. A portion of the leached clay is then resuspended to 20% solids and saturated with 3.03% $MgCl_2$ for 24 hrs. After saturation, 2.23% NaOH (0.8% solution) is slowly added to the saturated clay while intensely mixing at 3000 rpm with a Premier brand mixer. After addition of the NaOH solution, the mixture is mixed for 15 minutes at 3000 rpm using a Premier brand mixer. The resulting slurry is then filtered, resuspended to 20% solids and refiltered. The filtered clay is then resuspended to 20% solids and dispersed with sodium polyacrylate, screened through a 325 mesh sieve and spray-dried.

Example XI

The procedure of Example X is followed, except that 4.34% $MgCl_2$ and 3.19% NaOH are used.

TABLE 9

| | BROOKFIELD VISCOSITY | | |
|---|---|---|---|
| EXAMPLE | 20 RPM (cP) | 100 RPM (cP) | % SOLIDS |
| Control | 1138 | 225 | 60.0 |
| Example X | 102 | 110 | 59.8 |
| Example XI | 98 | 112 | 59.9 |

TABLE 10

| | BROOKFIELD VISCOSITY | | |
|---|---|---|---|
| EXAMPLE | 20 RPM (cP) | 100 RPM (cP) | % SOLIDS |
| Control | 102 | 83 | 48.8 |
| Example X | 102 | 110 | 59.8 |
| Example XI | 98 | 112 | 59.9 |

Tables 9 and 10 contain the viscosity results for the conventionally treated clay (i.e., the two controls) along with the clays treated by the process of this invention. Table 9 shows the variation in minimum Brookfield viscosity for the treated and untreated clay slurries at a constant percent clay solids. The results reveal a viscosity decrease, at 60.0 percent solids, from 1138 centipoises at 20 rpm for the conventionally treated control slurry to 98 centipoises at 20 rpm for the clay slurry (Example XI) treated by the process of this invention.

Table 10 shows the differences in percent clay solids for slurries at a constant viscosity (centipoises at 20 rpm) for the conventionally treated control slurry and the clay slurries treated by the process of this invention. The results reveal a treated clay slurry (Example XI) can obtain a viscosity of 98 centipoises at 59.9 percent solids, whereas an untreated control slurry obtains the same viscosity at only 48.8 percent solids.

Table 9 reveals the improvement in viscosity brought about by the process of this invention. Table 10 shows that one can obtain an equivalent viscosity at a much higher percent solids when the clay material is treated by the process of this invention.

The cation exchange capacity (CEC) of the slurries produced in Examples I–XI is determined by the Phelps et al. method described earlier in this application. The CEC results for the control slurries and the slurries treated by this invention are shown in the following Table A. We believe these results confirm that the process of this invention reduces, the CEC of the clay materials through the precipitation of a non-exchangeable compact layer in the interlayer region of the smectite. Higher amounts of magnesium cations may be required to reduce the CEC of some clay materials.

TABLE A

| EXAMPLE | CEC of Clay Before Treatment - Control | CEC of Clay After Treatment |
|---|---|---|
| I | 9.5 | 8.2 |
| II | 9.5 | 8.0 |
| III | 9.5 | 8.0 |
| IV | 4.4 | 4.4 |
| V | 4.4 | 3.8 |
| VI | 5.4 | 5.2 |
| VII | 5.4 | 3.8 |
| VIII | 6.8 | 5.6 |
| IX | 6.8 | 4.0 |
| X | 7.9 | 5.0 |
| XI | 7.9 | 4.8 |

This invention has been described in detail with particular reference to certain embodiments, but variations and modifications can be made without departing from the spirit and scope of the invention as defined in the following claims.

What is claimed is:

1. A process for treating clay materials which contain expandable layer-silicates, wherein the process comprises the steps of:
   A. obtaining an initial slurry of a clay material which contains expandable layer-silicates;
   B. treating the clay slurry with a source of magnesium cations; and
   C. adding a base solution to the treated clay slurry to achieve a molar ratio of hydroxide:magnesium ions of about 1.0:1.0 to about 2.5:1.0,
   whereby a treated clay is produced having rheological properties which are improved over the rheological properties of the initial clay slurry when compared at equivalent solids content.

2. A process as defined by claim 1 wherein the expandable layer-silicates are smectites, illites or a mixture thereof.

3. A process as defined by claim 1 wherein the expandable layer-silicates are smectites.

4. A process as defined by claim 1 wherein the clay material is kaolin clay.

5. A process as defined by claim 1 wherein the magnesium cations are derived from magnesium chloride, magnesium nitrate, magnesium hydroxide, magnesium acetate or a mixture thereof.

6. A process as defined by claim 1 wherein the magnesium cations are derived from magnesium chloride.

7. A process as defined by claim 1 wherein the base solution is sodium hydroxide, potassium hydroxide, ammonium hydroxide, lithium hydroxide, soda ash or a mixture thereof.

8. A process as defined by claim 1 wherein the base solution is sodium hydroxide.

9. A process as defined by claim 1 wherein the base solution is soda ash.

10. A process as defined by claim 1 wherein the molar ratio of hydroxide:magnesium ions is about 1.0:1.0 to about 2.0:1.0.

11. A clay slurry produced by a process which comprises the steps of:
   A. obtaining an initial slurry of a clay material which contains expandable layer-silicates;
   B. treating the clay slurry with a source of magnesium cations; and
   C. adding a base solution to the treated clay slurry to achieve a molar ratio of hydroxide:magnesium ions of about 1.0:1.0 to about 2.5:1.0,
   whereby a treated clay is produced having rheological properties which are improved over the rheological properties of the initial clay slurry when compared at equivalent solids content.

12. A clay slurry as defined by claim 11 wherein the expandable layer-silicates are smectites, illites or a mixture thereof.

13. A clay slurry as defined by claim 11 wherein the expandable layer-silicates are smectites.

14. A clay slurry as defined by claim 11 wherein the clay material is kaolin clay.

15. A clay slurry as defined by claim 11 wherein the magnesium cations are derived from magnesium chloride, magnesium nitrate, magnesium hydroxide, magnesium acetate or a mixture thereof.

16. A clay slurry as defined by claim 11 wherein the magnesium cations are derived from magnesium chloride.

17. A clay slurry as defined by claim 11 wherein the base solution is sodium hydroxide, potassium hydroxide, ammonium hydroxide, lithium hydroxide, soda ash or a mixture thereof.

18. A clay slurry as defined by claim 11 wherein the base solution is sodium hydroxide.

19. A clay slurry as defined by claim 11 wherein the base solution is soda ash.

20. A clay slurry as defined by claim 11 wherein the molar ratio of hydroxide:magnesium ions is about 1.0:1.0 to about 2.0:1.0.

* * * * *